United States Patent
Chen

(10) Patent No.: US 6,623,041 B1
(45) Date of Patent: Sep. 23, 2003

(54) METHOD FOR DISCERNING FALSE FROM GENUINE

(76) Inventor: Mingfa Chen, 26D, 38 Guomaodadao, Haikou City, Hainan Province (CN)

(*) Notice: Subject to any disclaimer, the term of this patent is extended or adjusted under 35 U.S.C. 154(b) by 0 days.

(21) Appl. No.: 09/762,433
(22) PCT Filed: Aug. 2, 1999
(86) PCT No.: PCT/CN99/00102
§ 371 (c)(1),
(2), (4) Date: Apr. 16, 2001
(87) PCT Pub. No.: WO00/08621
PCT Pub. Date: Feb. 17, 2000

(30) Foreign Application Priority Data

Aug. 8, 1998 (CN) ........................................ 98116463 A

(51) Int. Cl.$^7$ ............................................... B42D 15/00
(52) U.S. Cl. ........................... 283/70; 283/67; 705/500; 235/375
(58) Field of Search .............................. 283/67, 70, 72, 283/73, 74, 75, 82, 83, 117; 235/385, 383, 375, 380, 381; 705/58, 26, 500

(56) References Cited

U.S. PATENT DOCUMENTS

| | | | | |
|---|---|---|---|---|
| 4,593,936 A | * | 6/1986 | Opel | ........................... 283/83 |
| 5,486,022 A | * | 1/1996 | Crane | ........................... 283/83 |
| 6,030,691 A | * | 2/2000 | Burchard et al. | ............. 283/83 |
| 6,171,734 B1 | * | 1/2001 | Warner et al. | ................ 283/83 |

FOREIGN PATENT DOCUMENTS

| | | |
|---|---|---|
| CN | 92109558 | 3/1994 |
| CN | 95203425 | 1/1996 |

* cited by examiner

Primary Examiner—Willmon Fridie, Jr.
(74) Attorney, Agent, or Firm—Lowe Hauptman Gilman & Berner, LLP

(57) ABSTRACT

The present invention relates to a method for discerning false from genuine. The method increases the difficulty of imitation by means of using the intrinsic stochastic structural vein of the material itself as identification. According to the method, it is advisable to select the material with clear stochastic structural vein as marker, and to select the stochastic structural vein of the marker as identification information, the information is recorded by scanner and then is stored into the database of the computer identification system. Consumers may obtain relevant information of structural vein by telephone, fax or computer on line to testify whether a product is genuine or a counterfeit.

20 Claims, 3 Drawing Sheets

METHOD FOR DISCERNING FALSE FROM GENUINE

FIELD OF THE INVENTION

The present invention relates to an anti-counterfeiting technique, particularly, relates to a method which may discern the counterfeiting or passing off products from genuine by checking the vein identification information borne by the products

BACKGROUND OF THE INVENTION

The Chinese utility model, No.95203425.5, entitled "Cipher Identification for Anti-counterfeits" and filed on Feb. 7 of 1995, disclosed a mark for identifying counterfeiting products. The mark comprises a carrier bearing anti-counterfeiting information, the numbers and the cipher codes printed on the carrier, and a removable covering layer. The numbers and the codes are stored in the database of a computer identification system which may provide code information service to the consumers. Thus the consumers can testify whether the specific product he purchased is a counterfeit or not by simply dialing the codes printed on the product into the database. In such a manner, the ordinary work for discriminating counterfeits is simplified into a telephone inquiry. This patented technique is adopted in an anti-counterfeiting project called "Countrywide Telephone-code Anti-counterfeiting Systematic Engineering", which is launched and spread by the China Anti-counterfeiting Association. It is found in the practice, however, some counterfeiting products makers make the passing off products bearing the forged numbers and the forged codes through receiving the used numbers and codes carries or copying the used carries illegally.

The Chinese patent 92109558.9, entitled "A Cipher Trade-mark for Anti-counterfeiting", and filed on Aug. 16 of 1992, disclosed a label bearing drop-points distributed at random and bearing several observation lines divided into several pieces at random. The piece-number of lines on each label is different from that of others. The proprietor of the trademark may input a formula into the computer and obtain the specific number of the points matching with the lines for each label. The specific number and a disclosure date are then printed on the relevant label. The proprietor, on the specific date, will disclose the specific numbers to the publics. The products bearing incorrect numbers are the counterfeiting ones. Such a manner is inconvenient for consumers for the following reasons: firstly the consumers have to wait until the specific date printed on the labels; secondly the consumers have to look for the relevant media bearing the specific numbers or ask the proprietor for the number after describing the complex printed content on the label, such as strokes and radicals of Chinese characters, piece-number of reference lines, operational symbols, results and so on (The printed content is so complex that it is difficult to identify but easy to forge.); and thirdly, since the relations among those strokes, radicals, piece-number of reference lines, operational symbols and results are kept confidential until the specific date and the result is obtained only after the relations are disclosed together with correct number, the consumers therefore can not quickly calculate and obtain the result and directly judge whether the obtained result is correct or not. In addition, such a label is easy to be forged for the following reasons: firstly a certain number of points at a certain piece of the line may have numerous locations, it is easy to be imitated due to the locations of the points unaccurate; secondly, the counterfeits maker may obtain the code and make the counterfeits according to the code at the time when consumers obtain the same from the media; thirdly, the points adhere on surfaces of labels rather than combine with labels as a whole, so the points are easy to imitate by patching manually or by printing.

SUMMARY OF THE INVENTION

The objective of the present invention is to provide a convenient anti-counterfeiting method, by means of the method, whether a purchased product is a counterfeiting one can be testified from the information provided by the database of the computer identification system simply by dialing the codes into said computer identification system; and the character of the stochastic structural vein in the material of the character of stochastic structural vein of the marker material itself is used to judge whether a product is counterfeiting.

The objective of the present invention is realized as follows:

The products are coded, each one has at least one printed codes which are different from those of other products, the anti-counterfeiting information of the carrier is set on product. The information is stored, together with the codes, into the database of computer identification system that has been connected with telephone network or internet, the system provides the consumers with the anti-counterfeiting information at inquiry by the consumers. Said carrier on the product and is made of such materials that have clear, visible, stochastic structural vein. Said information is the image of stochastic structural vein on carrier.

It is advisable that the image of stochastic structural vein on carrier may be recorded by means of a digital scanner or a digital video camera, and the digital image is stored, together with the codes into the database of computer identification system that has been connected with telephone network or internet The consumers can obtain the image by fax or computer on line and compare the stochastic structural vein on carrier of the products with the image, so as to testify whether the products are counterfeits or not.

It is further advisable that some regions are selected as checkpoints of stochastic structural vein, and certain marks are set or printed as references to locate checkpoints; the location of each checkpoint relative to the reference is expressed by location code; the characters of the stochastic structural vein are expressed by codes, same characters of stochastic structural vein are expressed by same codes and the different characters of stochastic structural vein are expressed by the different codes; the information including locations of checkpoints and characters of structural vein are stored into the database of computer identification system which is connected with telephone network, wherein, the information is either in form of digital codes made up of the location codes of checkpoints and character codes of structural vein, or in form of phonic files describing locations of checkpoints and characters of structural vein. The consumers may inquire via a telephone to obtain the information of locations of checkpoints and characters of structural vein provided by the phonic files, so as to testify whether the products are counterfeiting ones or not.

It is further advisable that the digital codes directly representing the locations of the checkpoints and the characters of structural vein may be printed on the carriers. In addition, the explanation or illustration describing the relation between the digital codes and the locations of checkpoints and the relation between the digital codes and the character of structural vein may be printed on the carriers.

It is further advisable that the stochastic structural vein is not printed one but an intrinsic structure of the material of the carrier itself, so as to increase the difficulty of imitation.

It is further advisable that some natural materials with clear stochastic structural vein or apparent natural spots, such as wood block, stone, leaves of plant and shells etc. may be selected to make the carries, so as to increase the difficulty of imitation.

It is further advisable that paper, plastic sheet or multiplex sheet added with colored fibers or pieces may be selected as the materials of the carriers, in order to form clear stochastic structural vein to distinguish the material from the ordinary printed vein. Such carriers are difficult for imitation.

It is further advisable that plastic, glass, ceramics or compound material added with dye, impurities, irregular-shaped granules or air bubbles at random during the course of production may be selected as materials of the carriers in order to form clear stochastic structural vein, so as to increase the difficulty of imitation.

It is further advisable that the materials having three-dimensioned intrinsic structural vein may be selected as the materials of the carriers, so as to distinguish the vein from the printed vein. The carrier made of three-dimensioned material is difficult for imitation, as three-dimensioned material has multiple surfaces with more complex structural vein. It is more difficult to imitate such materials as cylindrical material, hemispheric material, prism-shaped material, quadrate material, pyramidal material, cambered material or slightly transparent material, only by plane printing apparatus.

It is better to whole cover or partly cover the codes in order to prevent from too many unnecessary telephone inquiries.

For the products adopting this invention, it is possible to select some part of the product as the carrier, and make the packaging and carrier as a whole.

The structural vein of the present invention is the intrinsic structural character of the material of carriers itself and may have various forms, such as spots, stripes, impurities, regions with different light-reflectivity, regions with different light-transparence, regions with rough surface, flaws, scars, bubbles, with or without filling and so on.

In order to locate checkpoints and structural vein, it is possible to print or set some marks as reference on the carrier. The reference may be various forms, such as coordinate, tabulation, ruler, alphabet, number, character, word, arrow, circle, pane, pentagon, animal pattern, sideline of marker, diagonal of marker, etc. It is better to mark the location of checkpoints as accurate as possible, so as to increase the difficulty of imitation.

In order to record, store and locate checkpoints, it is possible to mark location codes of checkpoints on or beside the checkpoints, for example, to mark the coordinated location codes.

In order that consumers can measure the size of the carrier and the reference conveniently, the length of the carrier and the reference may be selected as a certain length of integral times as long as, for example, one eighth or one sixth of the length or width of a certain bank note (one Yuan Chinese currency note as an example), so that consumers can use the note as a tool to compare the marker with bills at hand.

In order that consumers can make communication with the computer identification system conveniently, it is better to print the telephone number, fax number, or web address of the database of the computer identification system on the carriers.

BRIEF DESCRIPTION OF DRAWINGS

The present invention is further described by embodiments in accompanying with drawings. The embodiments of the invention are used to better explain this invention rather than limit to this invention.

THE PREFERRED EMBODIMENTS

Figure 1:
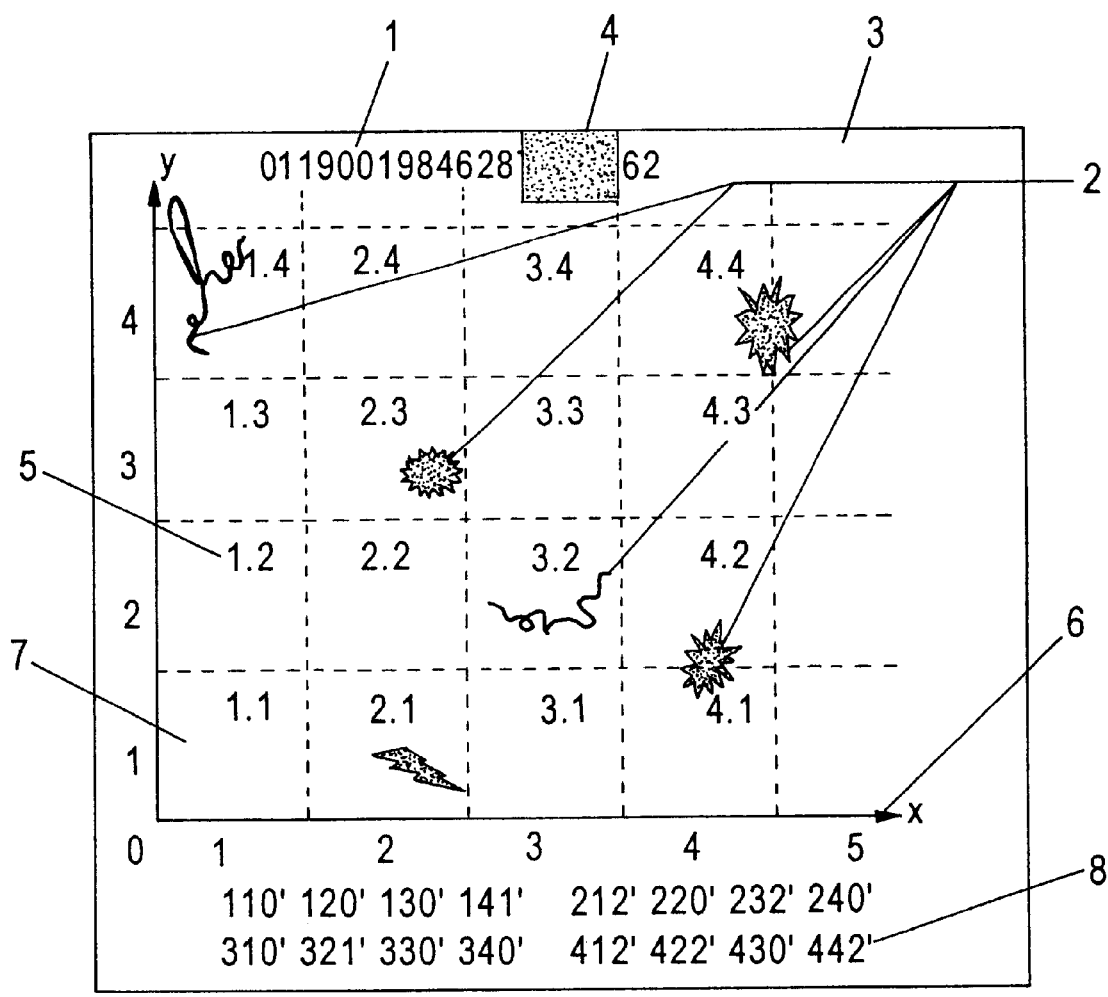
FIG. 1 is a top view of an anti-counterfeiting marker according to this invention showing the structural vein anti counterfeiting method of the invention.

FIG. 1 is a top view of an anti-counterfeiting marker according to this invention showing the structural vein anti counterfeiting method of the invention. The anti-counterfeiting marker is made up of a specially made paper which, during the course of production, is mixed with some fibers and wood crumb so that the clear fibrous and wood-crumb structural vein 2 can be seen. It is obvious that colored paper pieces, colored wood crumb, mica crumb and so on may be added also. The specially made paper is selected as the material of the carrier 3, a coordinate system comprising a vertical axis Y and a horizontal axis X as reference 6 is printed on the carrier 3 and besides the reference 6 at least one code 1 is printed which is different from the code 1 of any other reference 6. The coordinated location codes 5 are selected, in this embodiment, the checkpoints 7 are selected in sixteen regions whose selected coordinated location codes 5 (x .y) are (1.1), (1.2), (1.3), (1.4), (2.1), (2.2), (2.3), (2.4), (3.1), (3.2), (3.3), (3.4), (4.1), (4.2), (4.3), (4.4). Symbol 1' is used to represent fibrous structural vein, symbol 2' is used to represent wood-crumb structural vein, and symbol 0' is used to represent vacant structure (without structural vein). Thus, it is possible to use following digital codes 8 to represent the locations of the mentioned sixteen checkpoints 7 and the characters of their structural vein: (1.1)0', (1.2)0', (1.3)0', (1.4)1', (2.1)2', (2.2)0', (2.3)2', (2.4)0' (3.1)0', (3.2)1', (3.3)0', (3.4)0', (4.1)2', (4.2)2', (4.3)0', (4.4)2'. In order to simplify the digital codes 8, digital compression is adopted. For instance, the digital codes 8 in sequence can be expressed as 0'0'0'1' 2'0'2'0' 0'1'0'0' 2'2'0'2'. The digital codes 8 representing the locations of checkpoints 7 and the characters of their structural vein are called herein as compound codes of location and structural vein. Finally, the digital codes 8 (compound codes) of each marker are stored, in the file name codes 1, into the specific database 31 of the computer identification system 30 connected at 34 with telephone network 32, then each marker is stuck to a product that needs protection (a bottle of wine, as an example). The consumers may, at 35, dial codes 1 into the specific database 31 of the computer identification system 30 by telephone 36, and will hear such information of both locations of the checkpoints 7 and the characters of the structural vein as: "If the product you are inquiring has such marker that fibers in regions (1.4) and (3.2), and wood crumb in regions (2.1), (2.3), (4.1), (4.2) and (4.4), and there is nothing in the rest regions, the product is a genuine, or otherwise a counterfeit." The consumers may hear such computer phonetic information about the compound codes when dialing in the compound codes as: "The product you are inquiring has the correct compound codes of location and the structural vein. If the product you are inquiring has the checkpoints in same locations and same structural vein as the compound codes shown, it is a genuine, or otherwise a counterfeit." Besides, if the compound codes are incorrect, the computer phonetic information will tell you: "The product you are inquiring has incorrect codes, so it is x counterfeit."

Figure 2:
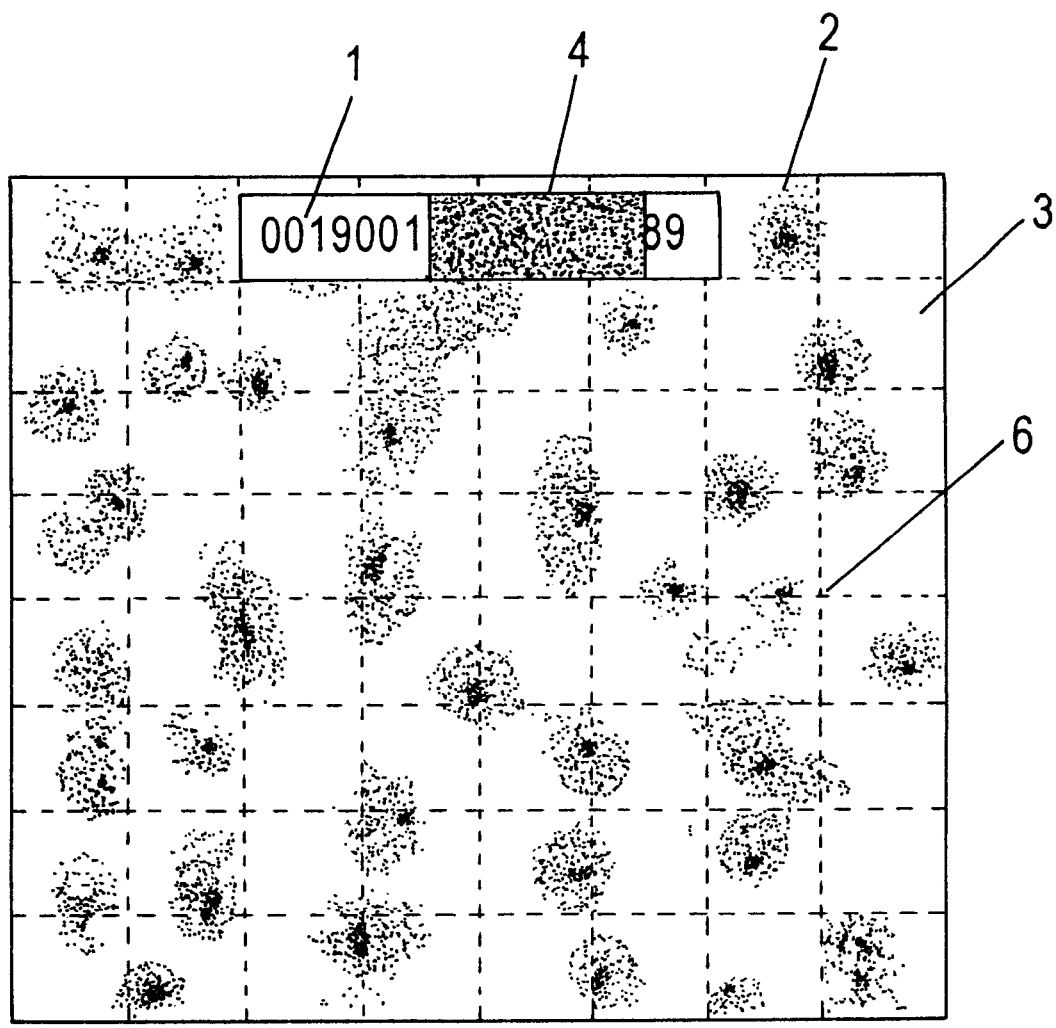
FIG. 2 is a top view of another anti-counterfeiting marker according to this invention showing the structural vein anti counterfeiting method of the invention.
Figure 3:
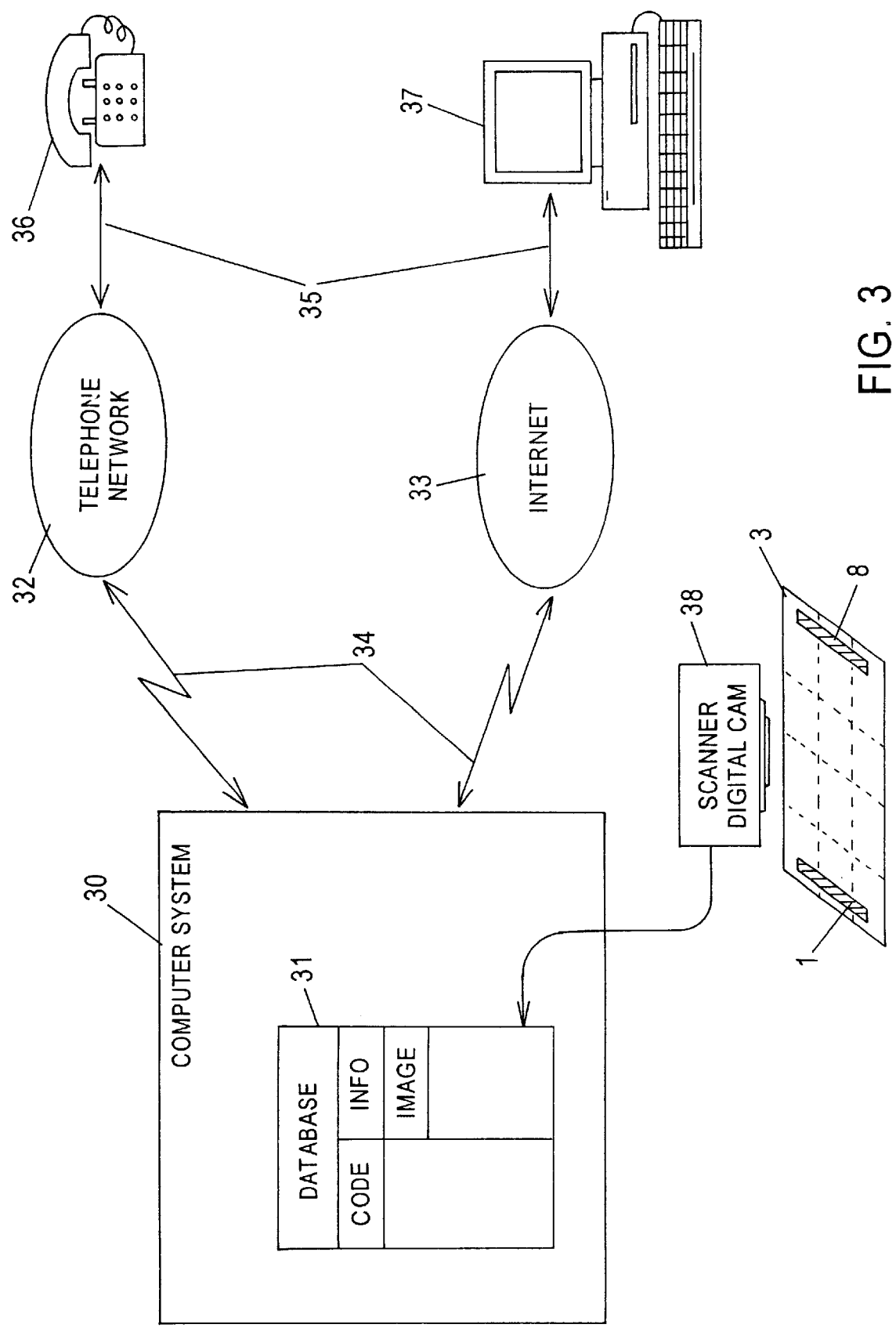
FIG. 3 is a schematic diagram of a system in which the method of the invention is implemented.

FIG. 2 is a top view of another anti-counterfeiting marker according to this invention showing the structural vein anti counterfeiting method of the invention. The anti-counterfeiting marker is made of natural surface-polished granite stone. The stone is selected as the material of the carrier 3. The marker is square shaped with side length of 63 mm (which equals to the width of one Yuan Chinese bank note) and thickness of 10 mm and is basically white with clear black structural vein 2 (natural spots) in it. Each marker is printed with at least a series of codes 1 which are different from the ones of any other marker and reference coordinate 6. The codes 1 are partly covered with covering layer 4. The structural vein 2 on the carrier 3 is recorded by a computerized scanner or a digital camera 38. The recorded image is stored, in the file name of codes 1, into the database 31 of the computer identification system 30 that is able to send fax automatically and has been connected at 34 with telephone network 36 and internet 37. Finally, these natural granite stones are stuck into the products that need protection (an engine of an automobile, for example). The consumers may dial codes 1 into the database of the computer identification system via fax or computer 37 on line so as to obtain the image information of structural vein 2 to find out whether a products is a genuine or a counterfeit.

INDUSTRIAL APPLICABILITY

The merits of the present invention lie in:

1. It is difficult to imitate. The structural vein 2 utilized by this invention is an intrinsic structural character of either natural material or man-made stochastic-formed three-dimensioned material, rather than surface character that can be forged by printing. Since the locations of checkpoints 7 and the characters of the structural vein of checkpoints 7 are defined, and the digital codes 8 representing the structural character information of the checkpoints 7 are accurate, it is difficult to forge such intrinsic structural vein by patching manually or by printing.

2. It is easy to identify. As long as a consumer inputs the codes 1 into the database of the computer identification system via fax or computer on line to obtain a fax image showing the structural vein 2 of the marker, and then compare the image with the structural vein 2 of the product, the product is judged a genuine or a counterfeit at once. A consumer may also dial codes 1 into the database of computer identification system by telephone to obtain the phonetic information about structural vein 2 of checkpoints 7, and then compare the information of the structural vein 2 obtained with the vein 2 of the product to find out whether the product is a genuine or a counterfeit. As is known to all, man-made wood pattern or marble pattern is two-dimensioned surface-printed vein. After the material is cut off, there is no vein inside the material. Therefore, it is easy to recognize printed vein.

3. It overcomes drawbacks of the prior art. Since the information of the codes 1 in the database corresponds to the characters of the structural vein 2 of the product, it is difficult to make imitation by reclaiming the used codes, or by repeatedly copying or printing same codes. The digital codes 8 which directly represent the location codes 5 of the checkpoints 7 and the characters of the structural vein 2, and the explanation of illustration of the relation between digital codes 8 and both of the locations of the checkpoints 7 and the character of structural vein 2 are printed on carrier 3, such information may be disclosed to the public as a criterion. In addition, the computer identification system database is adopted. The above stated features of the method of this invention help for achieving an automatic, simple, convenient, quick and accurate inquiry on whether a product purchased is a genuine or a counterfeit.

The above stated embodiments are just for better explaining to this invention. The person skilled in the art may improve the embodiments and/or make alternatives within the gist of the specification and drawings of this invention.

What is claimed is:

1. A product marking and identifying method, comprising the steps of:

assigning, for each product in a series of products, a unique code (1) to said product;

applying a carrier (3) of information to the product and selecting information on said carrier (3);

storing the information as well as said code (1) into a database of a computer system;

connecting the computer system to a telephone or computer network; and providing a consumer, upon receiving an inquiry from the customer, with the information to allow the customer to verify whether the product is genuine or counterfeit, wherein the carrier (3) is made of a material having unique, visually recognizable stochastic structural veins (2), an image of which is selected and stored as the information.

2. A method in accordance with claim 1, further comprising recording said image, which is a digital image, by a scanner or a video camera.

3. A method in accordance with claim 1, further comprising the following steps:

a. selecting some regions on said carrier (3) as checkpoints (7) of the stochastic structural veins (2); and b. setting or printing reference marks (6) on said carrier to locate the checkpoints (7).

4. A method in accordance with claim 3, further comprising the following steps:

c. using location codes (5) to represent locations of the checkpoints (7) relative to reference marks (6);

d. storing data representing the locations of the checkpoints (7) and characters of the stochastic structural veins in the database as said information.

5. A method in accordance with claim 1, wherein said stochastic structural veins (2) are intrinsic stochastic structural veins (2) of the material of the carrier (3).

6. A method in accordance with claim 5, wherein said intrinsic stochastic structural veins (2) are three-dimensional.

7. A method in accordance with claim 1, wherein said material is a natural material with naturally occurring said stochastic structural veins (2).

8. A method in accordance with claim 1, wherein said carrier (3) is made of a plastic-coated paper sheet or other compound material which has embedded therein colored fibers and paper pieces to make said stochastic structural veins (2).

9. A method in accordance with claim 1, wherein said carrier (3) is made of one selected from the group consisting of plastic, glass, ceramics or compound material, which has embedded therein dye, impurities, irregular-shaped granules or air bubbles to make said stochastic structural veins (2).

10. A method in accordance with claim 1, wherein lengths of the carrier (3) and reference marks (6) are integral times as long as one eighth or one sixth of the length or width of a specific bank note.

11. A method in accordance with claim 4, wherein the data representing the locations of the checkpoints (7) is marked at or beside said checkpoints (7).

12. A method in accordance with claim 4, further comprising printing said data, which includes the location codes (5) representing the locations of the checkpoints (7) and digital codes (8) representing the characters of the stochastic structural veins, on said carrier (3).

13. A method in accordance with claim 12, wherein said data is coded as follows:
   a. same digital codes represent same stochastic structural veins (2), and different digital codes represent different stochastic structural veins (2);
   b. the character the stochastic structural veins (2) of each checkpoint (7) is expressed by the respective digital code;
   c. the location of each checkpoint (7) relative to reference marks (6) is expressed by the respective location code (5);
   d. the digital codes (8) and location codes (5) are arranged in sequence.

14. A method in accordance with claim 1, further comprising printing the telephone number, the fax number or the web address for communication with the database of the computer system on said carrier (3).

15. A method in accordance with claim 1, wherein said carrier is a three-dimensional body of a shape selected from the group consisting of cylindrical shapes, hemispherical shapes, prismatic shapes, quadrate shapes, pyramidal shapes, and cambered shapes.

16. A method in accordance with claim 1, further comprising covering at least a part of the code to prevent said part from being visible.

17. A method in accordance with claim 1, wherein said providing step comprises transmitting an audible signal to said customer, said audible signal containing descriptive information of said image.

18. A method in accordance with claim 1, wherein said providing step comprises transmitting a visual signal to said customer, said visual signal containing said image.

19. A method in accordance with claim 3, wherein said reference marks define a plurality of regions of said carrier, said providing step comprises returning to the customer a phonetic description of said stochastic structural veins in at least one of said regions.

20. A method in accordance with claim 1, wherein said image is not an image of the product.

* * * * *